United States Patent
Kwok et al.

(10) Patent No.: US 10,601,472 B2
(45) Date of Patent: Mar. 24, 2020

(54) SYSTEMS AND METHODS FOR IMPROVING CELL-EDGE RECEIVER PERFORMANCE

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/182,917

(22) Filed: Nov. 7, 2018

(65) Prior Publication Data

US 2019/0149200 A1   May 16, 2019

Related U.S. Application Data

(60) Provisional application No. 62/585,892, filed on Nov. 14, 2017.

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0632* (2013.01); *H04B 7/0877* (2013.01); *H04B 7/063* (2013.01); *H04W 24/02* (2013.01)

(58) Field of Classification Search
CPC .. H04B 7/0417; H04B 7/0632; H04B 7/0877; H04B 7/063; H04W 24/02
See application file for complete search history.

(56) References Cited

U.S. PATENT DOCUMENTS

| | | | |
|---|---|---|---|
| 5,648,992 A | 7/1997 | Wright et al. | |
| 2008/0056414 A1* | 3/2008 | Kim ................. | H04B 7/063 375/347 |

(Continued)

FOREIGN PATENT DOCUMENTS

| | | |
|---|---|---|
| EP | 2760233 | 7/2014 |
| WO | WO0105088 | 1/2001 |

OTHER PUBLICATIONS

The PCT Search Report and Written Opinion dated Mar. 5, 2019 for PCT Application No. PCT/US2018/059773, 10 pages.

*Primary Examiner* — Syed Haider
(74) *Attorney, Agent, or Firm* — Lee & Hayes, P.C.

(57) ABSTRACT

Systems and methods for providing improved cell-edge antenna performance are disclosed. The system can use various signal quality indicators (SQIs) for each user equipment (UE) on a particular wireless base station (WBS) or network. When one or more of these metrics reaches a first predetermined value for a particular UE, the WBS or the UE can decide to activate a diversity receive (Rx) antenna on the UE to improve reception. If one or more of these metrics continues to degrade to a second predetermined value, however, the WBS or the UE can deactivate the diversity Rx antenna and activate a primary Rx antenna. Deactivating the diversity antenna when signal quality/strength is poor can improve reception by reducing interference between the diversity Rx antennas. Disabling the diversity Rx antenna when signal quality/strength is poor can also decrease the number of retransmission requests from each UE, reducing traffic on the WBS.

18 Claims, 6 Drawing Sheets

(51) Int. Cl.
*H04B 7/08* (2006.01)
*H04W 24/02* (2009.01)

(56) References Cited

U.S. PATENT DOCUMENTS

| | | | |
|---|---|---|---|
| 2009/0086648 A1* | 4/2009 | Xu ..................... | H04B 7/0689 370/252 |
| 2013/0244665 A1 | 9/2013 | Clevorn et al. | |
| 2013/0288624 A1* | 10/2013 | Mujtaba ............... | H04B 7/0817 455/140 |
| 2016/0173208 A1 | 6/2016 | Kuchi et al. | |
| 2016/0248496 A1* | 8/2016 | Bellamkonda ....... | H04B 7/0632 |

* cited by examiner

SYSTEMS AND METHODS FOR IMPROVING CELL-EDGE RECEIVER PERFORMANCE

CROSS-REFERENCE TO RELATED APPLICATIONS AND PRIORITY CLAIM

This application is a non-provisional of, and claims priority under 35 U.S.C. § 119(e) to, U.S. Provisional Patent Application No. 62/585,892, filed Nov. 14, 2017, and entitled, "Cell Edge Receiver Diversity Enhancement Algorithm," the entire contents of which is hereby incorporated by reference.

BACKGROUND

Cell phones and smartphones, sometimes referred to generically as user equipment (UE), are ubiquitous in modern life. UEs can be used to check e-mail, place cellular- and internet-based calls, maintain calendars, and provide a myriad of other applications. As UEs have added capabilities, however, the amount of data consumed by the average UE has increased. In addition, the sheer number of UEs in use at a given time in a given location can be enormous, which can exceed the capacity of a local cell tower, or wireless base station (WBS). This can create delays, errors, and other problems that can negatively impact UE performance and user's perceived quality of experience (QoE), among other things.

At the cell edge—i.e., at a distance that is relatively close to the maximum transmission range for the WBS—this traffic problem can be exacerbated by retransmission traffic. If a UE near the cell edge does not properly receive a packet of data, the UE can request that the packet be resent from the WBS to the UE. In fourth-generation (4G) networks, for example, this resend can be achieved by sending a hybrid automatic repeat request, or HARQ request, from the UE to the WBS. And, because it is a retransmission—as opposed to an initial transmission—a HARQ is given high-priority in the scheduling scheme of the WBS. If enough HARQ requests are received at the WBS during a given period of time, however, this can result in physical resource block (PRB) "starvation," causing delays for other UEs attempting to communicate with the WBS. Thus, even UEs close to the WBS and/or with strong signals may be unable to connect to the WBS or may experience errors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
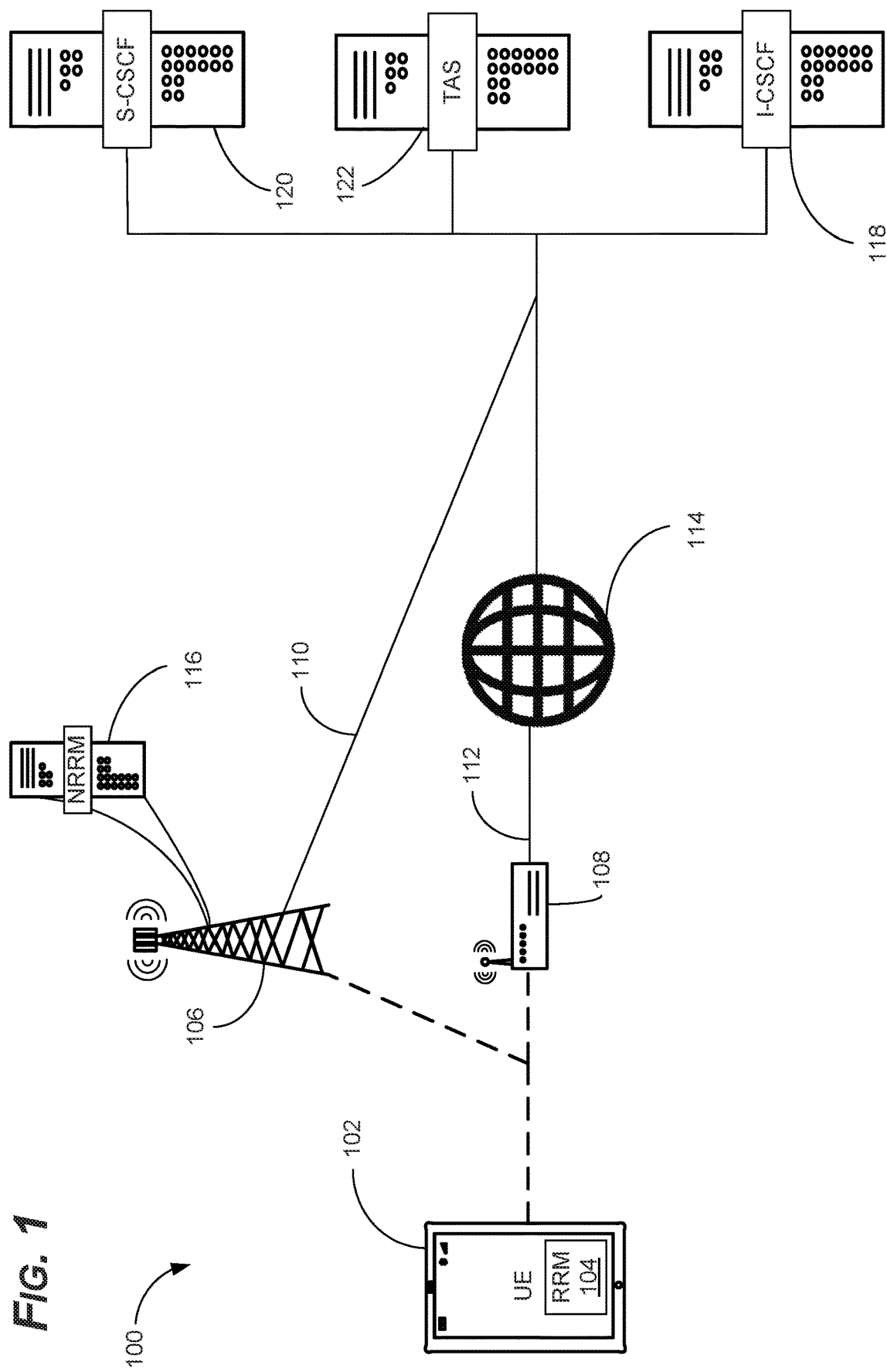
FIG. 1 depicts a system for providing improved cell edge antenna performance, in accordance with some examples of the present disclosure.

Examples of the present disclosure can comprise systems and methods for providing improved cell-edge receiver performance for users' equipment (UEs). The system can include an application including one or more signal monitors to monitor signal quality and/or power for a one or more UEs attached to a particular cell site such as, for example, a microcell or wireless base station (WBS). When one or more metrics related to signal quality and/or signal strength are above a first predetermined level on a UE, the UE can utilize a multiple input, multiple output (MIMO) antenna mode for improved throughput. When the signal strength is above a second predetermined level, but below the first predetermined level, the UE can use a diversity antenna mode for improved reception. If at least one of the one or more metrics falls below the second predetermined level, however, the UE can disable the diversity antenna mode and revert to a primary antenna mode to reduce cross-antenna interference and excessive retransmission, among other things.

The systems and methods are discussed generally herein with respect to cellular UEs and in terms of components (e.g., network entities) associated with fourth-generation (4G) and fifth-generation (5G) cellular networks. The systems and methods can be used with other types of equipment and on other types of networks, however, where diversity antennas are used to improve reception when conditions warrant (e.g., low signal quality). Thus, while described herein in terms of the 4G and 5G networks, one of skill in the art will recognize that the systems and methods could also be used on other types of networks that use diversity antennas under certain conditions.

For ease of explanation, the systems and methods described herein are described in terms of a UE (e.g., a cell phone, smart phone, or tablet computer) and a macro cell site, or WBS. These terms are used merely to simplify and clarify the disclosure. One of skill in the art will recognize that the systems and methods could be used with many types of devices that communicate wirelessly with many different types of base stations. The systems and methods disclosed herein could also be used with, for example, Wi-Fi routers, mini-cells, micro-cells, etc.

In addition, because signal quality and signal strength are closely related—i.e., greater signal strength equals greater signal quality, all other things being equal—the terms signal quality and signal strength are used below interchangeably. These parameters are often measured in different ways on different networks and may be measured in multiple ways on the same network. Thus, while block error rate (the BLER) and signal to noise ratio (SINR) are the predominant parameters discussed below, the systems and methods disclosed herein could also be used with other parameters such as, for example, received signal strength indicator (RSSI), reference signal received power (RSRP), reference signal received quality (RSRQ), etc. As used herein, "lower" SINR, for example, means a lower, or more negative, SINR (e.g., −12 Db is lower than −6 dB, −6 dB is lower than 0 dB, 0 dB is lower than 30 dB, etc.)

As mentioned above, using current technology, UEs use diversity antennas when signal strength is below a predetermined threshold. Diversity antennas include an array of multiple antennas designed to improve signal reception. They are especially effective when there is no direct line-of-sight between the WBS and the UE. The multiple antennas receive the same data along multiple paths, which can then be combined (using appropriate algorithms) to create a more robust wireless link. Many current UEs, for example, use a four-antenna MIMO array for sending and receiving transmissions from the WBS, which can be reconfigured to a two-way diversity receive antenna in certain conditions.

Conventional thinking is that diversity antennas will always improve reception and throughput, especially in low SINR situations. Somewhat counterintuitively, however, at predetermined level of SINR, somewhere between approximately −6 dB and 0 dB, throughput is actually reduced due to cross-antenna interference. In addition, because signal quality is low, the number of HARQ retransmissions goes up significantly. The number of HARQ retransmissions is further increased simply by the fact that there are multiple antennas in use on each UE.

Indeed, if there are a sufficient number of UEs at the cell edge, the number of HARQ retransmissions can become so high that physical resource block (PRB) starvation occurs. This problem is still further exacerbated by the long-term evolution (LTE) specifications, which prioritize retransmissions, for example, over initial transmissions. When PRB starvation occurs, even UE close to the WBS may be unable to connect because all resources are being consumed by HARQ retransmissions.

To this end, as shown in FIG. 1, examples of the present disclosure can comprise a system 100 for improved radio resource management (RRM). The system 100 can switch between MIMO, diversity, and main antennas as conditions warrant to improve throughput and reception, while minimizing retransmissions. The system 100 can monitor, for example, signal quality (e.g., SINR), the BLER, scheduling rate (SR), and other factors to determine when to switch between MIMO, diversity, and main antennas.

The system 100 can comprise a UE 102. The UE 102 can comprise a cellular phone, tablet computer, smart watch, or other device capable of connecting to one or more wireless and/or wired networks. The system 100 is discussed generally herein with respect to the cellular 4G and 5G networks, but could also be used with other wireless networks, such as Wi-Fi 108 and Bluetooth® networks, where edge reception may cause similar issues.

In some examples, some, or all, of the RRM functions can be located on the UE 102. The UE 102 can include a RRM application 104, for example, that is tasked with sending radio resource control (RRC) messages to a WBS 106 and/or managing radio resources directly on the UE 102. The RRM application 104 can receive information (e.g., from a transceiver on the UE 102) regarding the strength and/or quality of the connection between the UE 102 and the WBS 106. The RRM application 104 can receive or calculate various signal quality parameters such as, for example, BLER, SR, RSRP, RSRQ, SINR, etc. These parameters, and other parameters related to signal quality at the UE 102, can be referred to herein collectively as signal quality indicators, or SQI.

The RRM application 104 can also receive information related to current antenna visibility and/or rank indicator (RI) from the transceiver. For a 2×2 antenna array, as is found on most modern UEs 102, the RI can be 1 or 2. An RI=2 indicates that the antenna performance is near optimal with little, or no, interference between the antennas. In other words, the UE 102 can receive two uncorrelated signals from the WBS 106, one on each antenna. This may enable MIMO operation, for example, and/or preclude the use of diversity antennas. An RI=1, on the other hand, means that the two antennas are essentially acting as one antenna—i.e., the signal on each antenna is partially, or fully correlated.

The RRM application 104 may also receive or calculate information related to the BLER for one or more of the antennas. The BLER is calculated as the number of erroneous, or unusable, blocks over the total number of blocks in a data stream. As a result, the BLER can provide a useful empirical measure of antenna performance and signal quality because the number of errors increases as signal quality decreases. A BLER that is above a predetermined value (e.g., above between 3-10%) may indicate, for example, that the use of diversity antennas is causing interference, rather than improving reception.

In some examples, the RRM application 104 can also receive or calculate data related to the scheduling rate (SR) between the UE 102 and the WBS 106. The SR can be defined as the percentage of the total time the UE 102 is connected to the WBS 106, as opposed to being in idle state, divided by the total time for a particular data session. The total time the UE 102 was connected can be determined by how many frames, or subframes, are assigned to the UE in a given period—i.e., when the UE 102 was in radio network temporary identifier (RNTI) mode C. So, for example, if a given data session lasts 1200 ms and the UE 102 was in RNTI-C for 1000 ms, then the SR=(1000/1200)=0.833, or expressed as a percentage 83.33%.

In other examples, some, or all, of the RRM functions can be located at the WBS 106. In this example, the UE 102 can provide RRC messages to a network radio resource management (NRRM) server 116. The NRRM server 116 can be located at the WBS 106, for example, or can be a network entity in a remote location. The NRRM server 116 can comprise one or more servers configured to receive RRC messages from the UE 102, make various calculations and/or decisions, and then send RRC messages back to the UE 102 in response to the calculations and/or decisions. The RRC messages from the NRRM server 116 to the UE 102 can include increasing or decreasing transmit power, for example, using main or diversity antennas, using MIMO mode, etc. The methods 300, 400 discussed below, for example, could be performed on the UE 102 using the RRM application 104, performed by the NRRM server 116, or a combination thereof.

The UE 102 can also be in communication with a wireless (Wi-Fi) router, also referred to as a wireless residential gateway (WRG) 108 (the terms "Wi-Fi" and "WRG" are used interchangeably throughout this disclosure). The WBS 106 can provide the UE 102 with a cellular voice and/or data connection 110. The WRG 108, on the other hand, can provide the UE 102 with an internet protocol (IP) connection 112 (e.g., via the world-wide web (WWW) 114), which can also provide voice—e.g., voice over IP (VOIP)—and data services, among other things.

Once connected, the UE 102 can be routed to, and through various network entities to make voice and video calls, access the WWW 114, download or stream content, etc. The UE 102 can place a call to another UE, for example, and be routed to an interrogating call session control function (I-CSCF) 118. The I-CSCF 118, in turn, can locate the appropriate serving call session control function (S-CSCF) 120, and so on, until the call is routed from the UE 102 to the recipient UE. In some examples, the UE 102 may also be connected to one or more telephony application servers (TASs) 122. The TASs 122 can provide various functions such as, for example, streaming or live content, video calling, etc. Each TAS can provide one or more functions, though generally each TAS 122 is dedicated to one function, or a few functions, such as a particular application or service. These network entities are discussed below in more detail with reference to FIG. 2.

Figure 2:
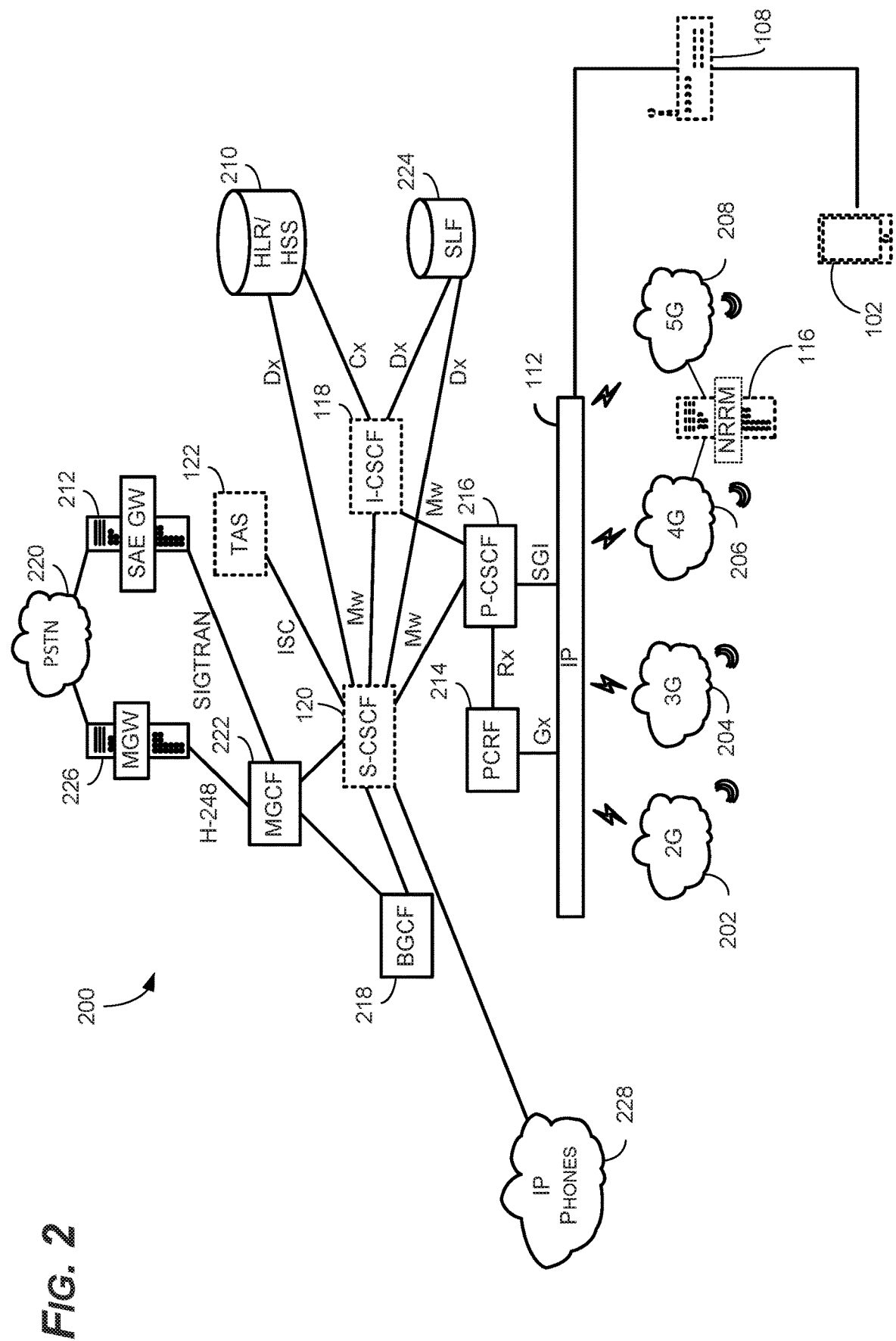
FIG. 2 depicts the system of FIG. 1 in the context of an internet multimedia subsystem (IMS), in accordance with some examples of the present disclosure.

FIG. 2 is an example of the system 100 of FIG. 1 (highlighted by dashed lines) in the context of an internet multimedia subsystem (IMS) 200. As shown, the IMS 200 includes the system 100 and several network components for routing signals, storing subscriber information, and connecting across various subsystems and network types. The IMS 200 is built on the session initiation protocol (SIP) and is the base to further support packaging of voice, video, data, and fixed and mobile services on a single platform to end users. It enables communications across multiple types of networks, including cellular, satellite, broadband, cable, and fixed networks, and enables the creation of efficient inter-operating networks.

As shown, the IMS 200 also provides interoperability for the UE 102 and other devices across multiple networks including, for example, 2G 202, 3G 204, 4G 206, 5G 208, Wi-Fi 108, and IP 112 networks. Thus, the IMS 200 provides the interoperability to enable the UE 102 to connect to multiple networks (e.g., the 4G 206 and 5G 208 networks) separately or simultaneously. The UE 102 can connect to the 4G 206 network for some services (e.g., voice and/or video calls), for example, and the Wi-Fi 108 network for other services (e.g., large downloads).

The IMS 200 can also include the NRRM server 116. And, while the NRRM server 116 is shown in communication with the 4G 206 and 5G 208 networks in this example, the NRRM server 116 could also be in communication with other networks (e.g., the 2G 202 and 3G 204 networks). The NRRM server 116 could also be standalone or located on one or more network entities, including existing network entities (e.g., the P-CSCF 216 or HLR/HSS 210). As mentioned above, some or all of the functions of the NRRM server 116 could also be performed on the UE 102. The IMS 200 also includes a variety of network entities for providing different services, which can include the S-CSCF 120, I-CSCF 118, and one or more TASs 122.

As mentioned above, the NRRM server 116 can comprise one or more servers located at the WBS 106 or at the network core to provide RRM for the UE 102, including antenna management. As discuss below with respect to FIGS. 3 and 4, the NRRM server 116 and/or the UE 102 can use a variety of methods 300, 400 that each utilize one or more SQIs to determine which antenna configuration should be used by the UE 102. The NRRM server 116 can be located at the WBS 106, for example, and can receive RRC messages from the UE 102, analyze various SQIs, and then send RRC messages to the UE 102, as necessary, to adjust antenna configurations, power settings, etc. in response to changing conditions. This can reduce error rates, such as BLER, and can reduce traffic at the WBS 106 by reducing the number of HARQ requests coming from the UE 102, among other things.

In some examples, the IMS 200 can also include, for example, a home location register/home subscriber service (HLR/HSS) 210, a service architecture evolution gateway (SAE GW) 212, and a policy and charging rules function (PCRF) 214, among other things. The HLR/HSS 210 is a central database that contains user-related and subscription-related information. The functions of the HLR/HSS 210 include mobility management, call and session establishment support, user authentication and access authorization. The HSS, which is used for 4G 206 and 5G 208 connections, is based on the previous HLR and authentication center (AuC) from code division multiple access (CDMA) and global system for mobile communications (GSM) technologies, with each serving substantially the same functions for their respective networks.

The HLR/HSS 210 can also serve to provide routing instructions (e.g., IP addresses or phone numbers for various requests), and provide any billing associated with these requests (e.g., to access a roaming network). The P-CSCF 216 can provide information to the HLR/HSS 210 with the necessary credentials to enable the UE 102 to access the 4G 206 and/or 5G 208 networks, for example, via the IMS 200. Once authenticated, the HLR/HSS 210 can ensure the user is authorized to use the services included in the requests (e.g., to make a VOIP call or download a file) or send an authorization request to a third-generation partnership project authentication, authorization, and accounting (3GPP AAA) server, among other things.

The SAE GW 212 routes and forwards user data packets, while also acting as the mobility anchor for the user plane during inter-eNodeB handovers and as the anchor for mobility between 4G 206, 5G 208, and other 3GPP technologies. The SAE GW 212 is also responsible, for example, for terminating the S4 interface and relaying traffic between 2G 202 and 3G 204 systems and the packet data network gateway (PGW). When the UE 102 is in idle state, the SAE GW 212 terminates the downlink data path and triggers paging when downlink data arrives for the UE 102. The SAE GW 212 also manages and stores UE contexts such as, for example, parameters of the IP bearer service and network internal routing information.

The PCRF 214 is a software node that determines policy rules in the overall cellular network, and in the IMS 200 specifically. The PCRF 214 generally operates at the network core and accesses subscriber databases (e.g., via the HLR/HSS 210) and other specialized functions, such as content handling, such as whether the user has sufficient data left in their plan to download a file, in a centralized manner. The PCRF 214 is the main part of the IMS 200 that aggregates information between the IMS 200 and other sources. The PCRF 214 can support the creation of rules and then can automatically make policy decisions for each subscriber active on the IMS 200. The PCRF 214 can also be integrated with different platforms like rating, charging, and subscriber databases or can be deployed as a standalone entity.

The IMS 200 also includes the P-CSCF 216. The P-CSCF 216 is the entry point to the IMS 200 and serves as the outbound proxy server for the UE 102. The UE 102 attaches to the P-CSCF 216 prior to performing IMS registrations and initiating SIP sessions. The P-CSCF 216 may be in the home domain of the IMS operator, or it may be in the visiting domain, where one or more UEs are currently roaming. For attachment to a given P-CSCF 216, the UE 102 performs P-CSCF 216 discovery procedures. Attachment to the P-CSCF 216 enables the UE 102 to initiate registrations and sessions with the IMS 200.

The IMS 200 also includes the I-CSCF 118. The I-CSCF 118 acts as an inbound SIP proxy server in the IMS 200. During IMS registrations, the I-CSCF 118 queries the HLR/HSS 210 to select the appropriate S-CSCF 120 which can serve the UE 102. During IMS sessions, the I-CSCF 118 acts as the entry point to terminating session requests. The I-CSCF 118 routes the incoming session requests to the S-CSCF 120 of the called party.

The S-CSCF 120 acts as a registrar server, and in some cases, as a redirect server. The S-CSCF 120 facilitates the routing path for mobile-originated or mobile-terminated session requests. The S-CSCF 120 also interacts with various components for playing tones and announcements, among other things. For the systems and methods discussed herein, the S-CSCF 120 can receive requests to register from the UE 102, for example, and establish the appropriate sessions with third-party application servers, TAS(s) 122, and other entities according to the services requested by the UE 102.

The IMS 200 also includes a breakout gateway control function (BGCF) 218. The BGCF 218 is the IMS 200 element that selects the network in which public switched telephone network (PSTN) 220 (discussed below) breakout is to occur. If the breakout is to occur in the same network as the BGCF 218, for example, then the BGCF 218 selects a media gateway control function (MGCF) 222 (also discussed below) that will be responsible for interworking with the PSTN 220. The MGCF 222 then receives the SIP signaling from the BGCF 218.

The IMS 200 also includes a subscriber location function (SLF) 224. The SLF 224 provides information to the HLR/HSS 210 with respect to user profiles and other information and is generally implemented using a database. If the IMS 200 contains more than one HLR/HSS 210, then the I-CSCF 118 and S-CSCF 120 will communicate with the SLF 224 to locate the appropriate HLR/HSS 210.

The IMS 200 also includes the aforementioned TAS(s) 122. As the name implies, TAS(s) 122, sometimes known in a telephony-only context simply as application servers (ASs), are components used to provide telephony applications and additional multimedia functions. The TAS 122 can include any entity in a telephone network that carries out functions that are not directly related to the routing of messages through the network, such as third-party application servers, and other entities that provide downloads, streaming video, and other services. Such functions can also include, for example, in-network answering machines, automatic call forwarding, conference bridges and other types of applications. And, while shown as a single entity in FIG. 2, multiple TASs 122 are generally used, with each TAS 122 providing one or more separate services. Based on the services requested by the UE 102 to the S-CSCF 120, for example, the S-CSCF 120 can establish sessions with one or more TASs 122, generally with one TAS 122 for each service.

The IMS 200 also includes the MGCF 222. The MGCF 222 is a SIP endpoint that handles call control protocol conversion between SIP and ISDN user part (ISUP)/bearer-independent call control (BICC) and interfaces with the SAE GW 212 over stream control transmission protocol (SCTP). The MGCF 222 also controls the resources in a media gateway (MGW) 226 across an H-248 interface. The MGW 226 is a translation device or service that converts media streams between disparate telecommunications technologies such as plain old telephone service (POTS), SS7, next generation networks (2G 202, 3G 204, 4G 206, and 5G 208), or private branch exchange (PBX) systems.

Finally, the IMS 200 also includes the PSTN 220. The PSTN 220 is the world's collection of interconnected voice-oriented public telephone networks, both commercial and government-owned. In some cases, the PSTN 220 can also be referred to as the POTS. With respect to IP phones 228, for example, the PSTN 220 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 3:
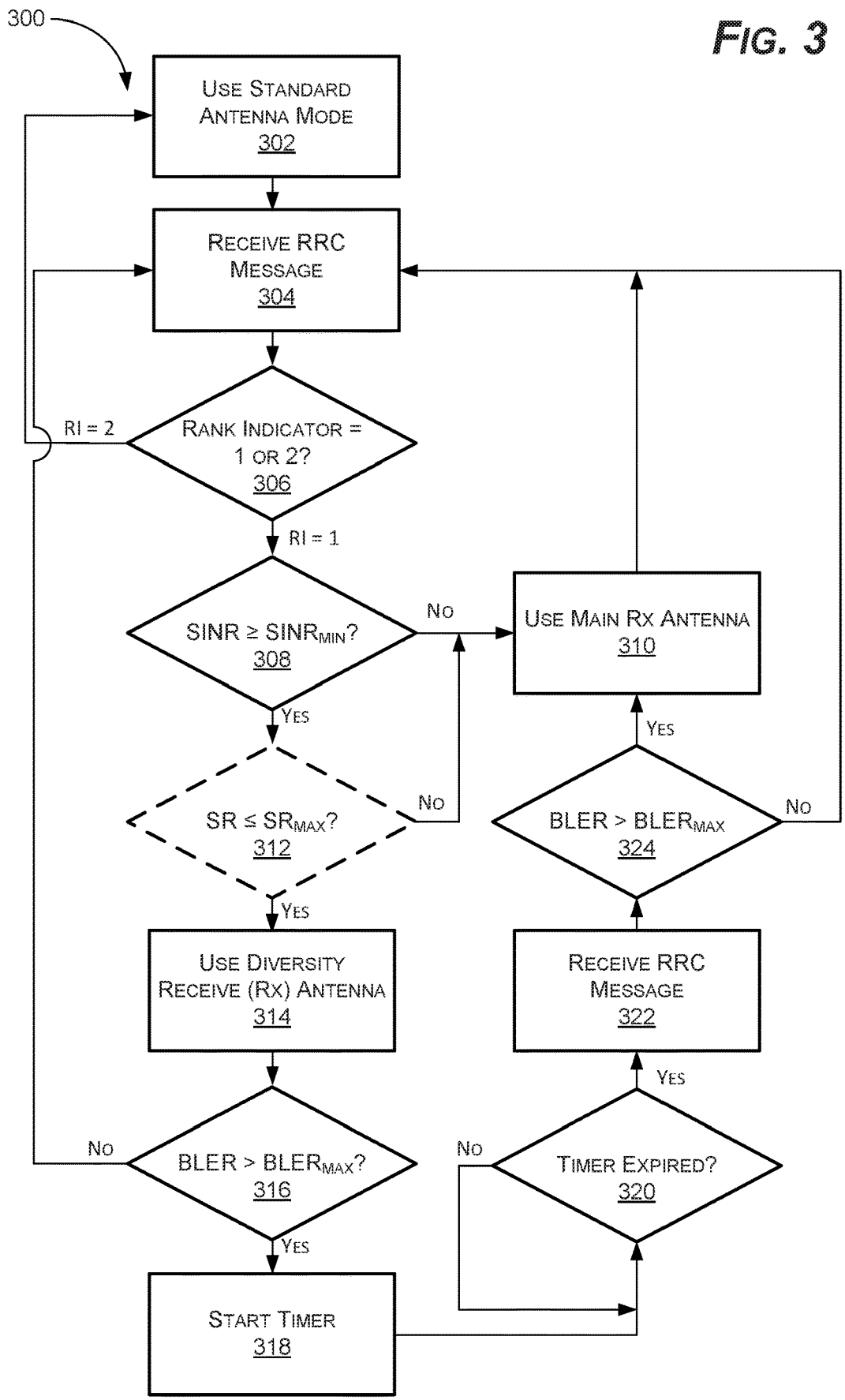
FIG. 3 is a flowchart depicting an example of a method for providing improved cell edge antenna performance, in accordance with some examples of the present disclosure.

As shown in FIG. 3, examples of the present disclosure can comprise a method 300 for managing antenna configuration on the UE 102 based on a number of factors. As mentioned above, using diversity receive (Rx) antennas below a predetermined signal quality can actually decrease reception quality due to interference between the multiple antennas, among other things. In addition, the use of multiple antennas when signal quality is low can also multiple the number of HARQ requests, leading to PRB starvation at the WBS 106. And, because HARQ retransmissions have high priority on the WBS 106, PRB starvation can actually cause UEs with high signal quality to experience delays, dropouts, and other errors.

For ease of explanation, the method 300 is described below from the perspective of the NRRM server 116. In other words, as described below, the NRRM server 116 receives RRC messages from the UE 102, makes certain calculations and/or decisions, and then sends RRC messages back to the UE 102 to activate and deactivate various antenna modes. As mentioned above, however, the method 300 can also be performed on the UE 102 by the RRM application 104 or can be performed on a combination of the RRM application 104 and the NRRM server 116. The RRM application 104, for example, may calculate the SINR directly from data provided by the transceiver on the UE 102, calculate a channel quality indicator (CQI), and then provide this information to the NRRM server 116 for further calculations/decision-making.

The example below also assumes a UE 102 with a 2×2 MIMO antenna array. Of course, other antenna configurations could be used in a similar manner by simply adjusting some parameters (e.g., RI) to the particular antenna configuration. Thus, the use of a 2×2 MIMO array, and parameters associated therewith, is merely intended to simplify and clarify—and not limit—the disclosure.

At 302, the method 300 can start with the antennas on the UE 102 in "standard" mode. This can vary by type of UE 102, but for a UE 102 on an LTE network, for example, this generally means that the antenna is operating in MIMO mode when signal quality is good. This increases the throughput to the UE 102 and makes applications that require large amounts of data possible, among other things. In this mode, a 2×2 MIMO array, for example, may be simultaneously transmitting to the WBS 106 on two antennas and simultaneously receiving from the WBS 106 on the other two antennas.

At 304, the NRRM server 116 can receive an RRC message from the UE 102. The RRC message can include one or more parameters associated with signal quality. The RRC message can include, for example, RI, SINR, RSRP, RSRQ, scheduling rate, BLER, and/or other information. As discussed below, based in part on one or more parameters in the RRC message, the NRRM server 116 can (re)configure the antennas on the UE 102.

For a 2×2 MIMO antenna array, for example, the RI can be equal to 1 or 2. When RI=2, this indicates that the two Rx antennas are performing optimally (i.e., as two antennas), with little, or no, interference between the two antennas. When RI=1, on the other hand, this indicates that there is significant interference between the antennas. As a result, when RI=1, the antennas "appear" to the UE 102 to be a single antenna.

Thus, in some examples, RI can be used as an initial indicator of signal quality. If the RI=2, signal quality can be assumed to be good enough to continue using MIMO mode on the antennas. If RI=1, on the other hand, using MIMO mode is no longer effective and further analysis can determine whether antenna performance can be optimized using diversity Rx antenna mode or simply using main Rx antenna mode. To this end, at 306, the NRRM server 116 can determine if the RI provided in the RRC message is equal to 1 or 2.

If RI=2, then at step 302, the UE 102 can continue to use the antennas in standard mode (e.g., MIMO mode). An RI=2 indicates that the two Rx antennas are working separately and effectively, which provides increased throughput, among other things. If RI=1 on the other hand, then at step 308, the NRRM server 116 can next determine if the SINR is greater than $SINR_{MIN}$. $SINR_{MIN}$ can vary somewhat based in part on the sophistication of the UE 102, antenna design, atmospheric conditions, traffic, and other factors. Newer UE 102 may have better signal processing when compared to older UE 102, for example, to enable acceptable performance at lower SINRs. In general, however, when SINR approaches somewhere between approximately −6 dB and 0 dB, a single main Rx antenna will outperform diversity Rx antennas by eliminating interference between the antennas, among other things. As mentioned above, this also reduces the number of HARQ retransmissions, decreasing unnecessary traffic on the WBS 106.

If the SINR is not greater than or equal to $SINR_{MIN}$, then at 310, the NRRM server 116 can send an RRC reconfigure message to the UE 102 to deactivate MIMO mode and revert to using a single main antenna. As mentioned above, at a sufficiently low SINR, using diversity Rx antennas can actually reduce performance. In addition, using diversity Rx antennas below $SINR_{MIN}$ can increase the number of HARQ retransmissions both because signal quality is low and because HARQ requests may be sent from multiple antennas at the same time.

If SINR is greater than or equal to $SINR_{MIN}$ (e.g., −6 dB, 0 dB, 6 dB, etc.), on the other hand, then in some examples, the NRRM server 116 can optionally also monitor SR. Thus, at step 312, the NRRM server 116 can determine if SR is less than or equal to $SR_{MAX}$. $SR_{MAX}$ can vary from WBS 106 to WBS 106, but generally indicates an issue somewhere between 30% and 40%. In this example, $SR_{MAX}$ can be assumed to be 35%. If SR is greater than $SR_{MAX}$, then at step 310, the NRRM server 116 can send an RRC message to the UE 102 to revert to a single main Rx antenna.

If SR is less than or equal to $SR_{MAX}$, on the other hand, then at 314, the NRRM server 116 can send an RRC message to the UE 102 to deactivate MIMO mode on the antennas and reconfigure to use diversity Rx antenna mode. The use of diversity Rx antennas can improve reception and reduce error rates at low SINRs by providing multiple reception paths for incoming data, which can then be reassembled and error-checked at the UE 102. As mentioned above, however, at sufficiently low SINR—somewhere between approximately −6 dB and 6 dB, depending on various factors—diversity antennas cease to be effective.

To this end, at 316, the NRRM server 116 can determine if the BLER is greater than $BLER_{MAX}$ to monitor the effectiveness of the diversity antennas. $BLER_{MAX}$ can vary depending on the UE 102, the WBS 106, the type of network, and other factors, but usually becomes an issue somewhere between approximately 3% and 9%. In this example, the $BLER_{MAX}$ can be assumed to be 6%. Thus, if the BLER is greater than the $BLER_{MAX}$—even when SINR is greater than or equal to $SINR_{MIN}$—the effectiveness of the diversity antennas is reduced.

Because the BLER is somewhat transient and diversity antennas can significantly improve reception in many conditions, in some examples, the BLER can be checked more than once prior to deactivating the diversity antennas. Thus, if the BLER is greater than the $BLER_{MAX}$, then at 318 a timer can be set to recheck the BLER prior to deactivating the diversity Rx antenna mode. Because the UE 102 sends periodic RRC messages to the WBS 106 (typically every 10 ms), in some examples, the timer can be set to some multiple of 10 ms. Thus, the timer may be set to 50 ms or 100 ms, for example, to provide a sufficient number of samples and to ensure the BLER has stabilized.

The timer may also be based in part on current conditions. If the BLER significantly exceeds $BLER_{MAX}$, for example, a shorter timer may be warranted because the error rate is high, which may cause more issues for the UE 102. If the BLER is borderline (e.g., within 1% or 2% of $BLER_{MAX}$), on the other hand, then the timer may be set to a higher value to determine whether BLER increases or decreases. In addition, while the BLER is shown being rechecked only once in FIG. 3, BLER could also be checked multiple times prior to the expiry of the timer. If the UE 102 sends RRC messages every 10 ms and the timer is set for 50 ms, for example, the NRRM server 116 could recheck the BLER once after 50 ms or recheck the BLER five times—every 10 ms for 50 ms.

At 320, the NRRM server 116 can determine if the timer has expired. If not, in some examples, the NRRM server 116 can simply ignore incoming RRC messages until the timer expires. In other examples, the NRRM server 116 can recheck the BLER multiple times until the timer expires, as discussed above. When the timer expires, then at 322, the NRRM server 116 can receive another RRC message from the UE 102. At 324, the NRRM server 116 can recheck the current BLER to determine if the BLER still exceeds $BLER_{MAX}$.

If BLER still exceeds $BLER_{MAX}$, then at 310, the NRRM server 116 can send an RRC message to the UE 102 to revert to using the main Rx antenna. If, on the other hand, BLER does not exceed $BLER_{MAX}$, then at 304, the NRRM server 116 can do nothing and simply receive the next RRC message from the UE 102 (or send an RRC message to the UE 102 to maintain the current configuration). In this case, the excessive initial BLER appears to be transient and the diversity antennas can remain active. Thus, the method 300 can use a combination of RI, SR, BLER, and other SQIs to provide improved RRM for the UE 102 and the WBS 106.

Figure 4:
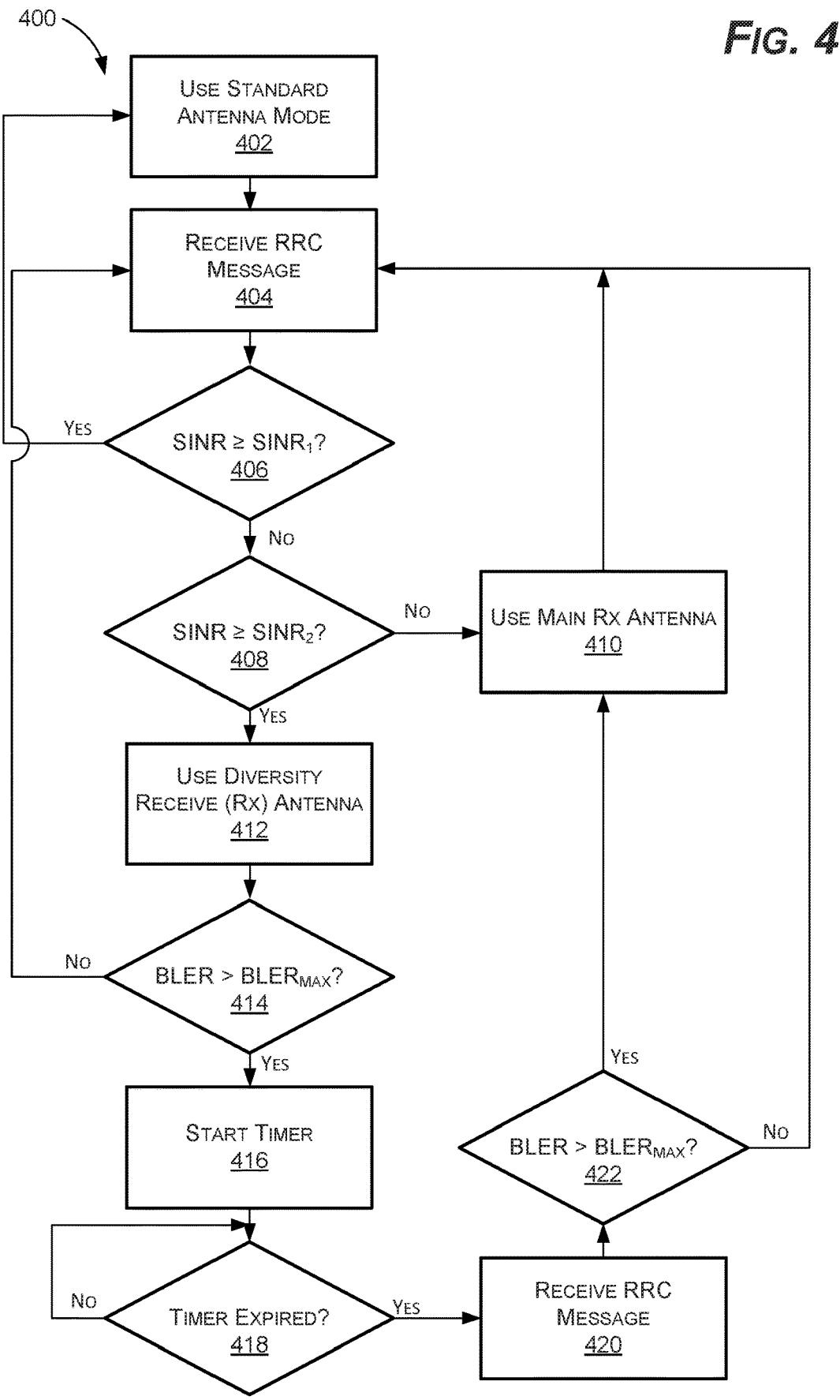
FIG. 4 is a flowchart depicting another example of a method for providing improved cell edge antenna performance, in accordance with some examples of the present disclosure.

Of course, as shown in FIG. 4, a similar method 400 could also be used with slightly different parameters. Instead of using RI as an initial measure, for example, the NRRM server 116 could simply use SINR. As SINR drops below an initial SINR, $SINR_1$, for example, the UE 102 could be instructed to activate diversity antenna mode. If the SINR continues to drop below a second SINR, $SINR_2$, however, then the diversity antennas could be deactivated in favor of the main Rx antenna mode. In between $SINR_1$ and $SINR_2$, the method 400 can use the BLER to monitor the effectiveness of the diversity antennas and reconfigure the antennas as necessary.

To this end, at 402, the method 400 can start with the antennas on the UE 102 in standard mode. At 404, the NRRM server 116 can receive an RRC message from the UE 102. As before, the RRC message can include one or more SQIs.

At 406, the NRRM server 116 can determine if the SINR is greater than $SINR_1$. $SINR_1$ can vary somewhat based in part on the sophistication of the UE 102, antenna design, atmospheric conditions, traffic, and other factors. $SINR_1$ can nonetheless represent the crossover point between conditions that are sufficient to support MIMO Rx mode, for example, and conditions that warrant diversity Rx antenna mode for improved accuracy. $SINR_1$ can vary widely by UE 102 and network type (e.g., 4G or 5G), among other things. In general, however, the crossover point where diversity Rx antennas become more effective then MIMO Rx antennas is somewhere between approximately 7 dB and 12 dB. In this example, $SINR_1$ can be assumed to be 10 dB.

If SINR is greater than or equal to $SINR_1$, then signal quality is such that MIMO Rx antennas can be used effectively and no action is necessary. Thus, at step 404, the NRRM server 116 can simply receive the next RRC message from the UE 102 for evaluation and leave the antennas in standard mode.

If, on the other hand, the SINR is less than $SINR_1$, then the NRRM server 116 can next determine whether to activate the diversity Rx antenna mode or the main Rx antenna mode. As mentioned above, somewhat counterintuitively, at some sufficiently low SINR, the diversity Rx antenna ceases to be effective at improving reception and can also increase the number of HARQ requests. To this end, at 408, the NRRM server 116 can next determine if the SINR is greater than or equal to $SINR_2$—i.e., the point at which diversity Rx antennas cease to be effective. As before, $SINR_2$ can vary based on the type of UE 102, the type of network, and other conditions. In general, however, $SINR_2$ can be between approximately −6 dB and 6 dB. For this example, $SINR_2$ can be assumed to be 0 dB.

If the SINR is less than $SINR_2$, then at 410, the NRRM server 116 can send an RRC reconfigure message to the UE 102 to deactivate MIMO mode and revert to using a single main antenna. If SINR is greater than or equal to $SINR_2$, on the other hand, then at 412, the NRRM server 116 can send an RRC message to the UE 102 to deactivate MIMO mode on the antennas and activate diversity Rx antenna mode. As before, the NRRM server 116 can then use BLER to monitor the effectiveness of the diversity Rx antennas.

To this end, at 414, the NRRM server 116 can determine if the BLER is greater than $BLER_{MAX}$. As above, $BLER_{MAX}$ can vary depending on the UE 102, the WBS 106, the type of network, and other factors, but usually becomes an issue somewhere between approximately 3% and 9%. In this example, the $BLER_{MAX}$ can be assumed to be 6%. Thus, if the BLER is greater than the $BLER_{MAX}$—even when SINR is greater than or equal to $SINR_2$—the error rate is high and the effectiveness of the diversity antennas is not good. If BLER is less than or equal to $BLER_{MAX}$, then the error rate is sufficiently low for the continued use of the diversity Rx antenna. If BLER is less than or equal to $BLER_{MAX}$, then at 404, the NRRM server 116 can simply receive the next RRC message without reconfiguring the antennas.

As mentioned above, BLER is somewhat transient and diversity antennas can significantly improve reception in many conditions. As a result, in some examples, the BLER can be checked more than once prior to deactivating the diversity antennas. Thus, if the BLER is greater than the $BLER_{MAX}$, then at 416, a timer can be set to recheck the BLER one or more times prior to deactivating the diversity antennas. The parameters for setting the timer and/or rechecking BLER can be similar to those described above for FIG. 3.

At 418, the NRRM server 116 can determine if the timer has expired. If not, in some examples, the NRRM server 116 can simply ignore incoming RRC messages until the timer expires. In other examples, the NRRM server 116 can recheck the BLER multiple times until the timer expires, as discussed above. When the timer expires, then at 420, the NRRM server 116 can receive another RRC message from the UE 102. At 422, the NRRM server 116 can check the current BLER to determine if the BLER still exceeds $BLER_{MAX}$.

If BLER still exceeds $BLER_{MAX}$, then at 410, the NRRM server 116 can send an RRC message to the UE 102 to revert to using the main Rx antenna mode. If, on the other hand, BLER does not exceed $BLER_{MAX}$, then at 404, the NRRM server 116 can do nothing and simply receive the next RRC message from the UE 102. In this case, the excessive initial BLER was transient and the diversity antennas can remain active. Thus, the method 300 can use a combination of two or more SINRs, BLER, and other SQIs to provide improved radio resource management for the UE 102 and the WBS 106.

Figure 5:
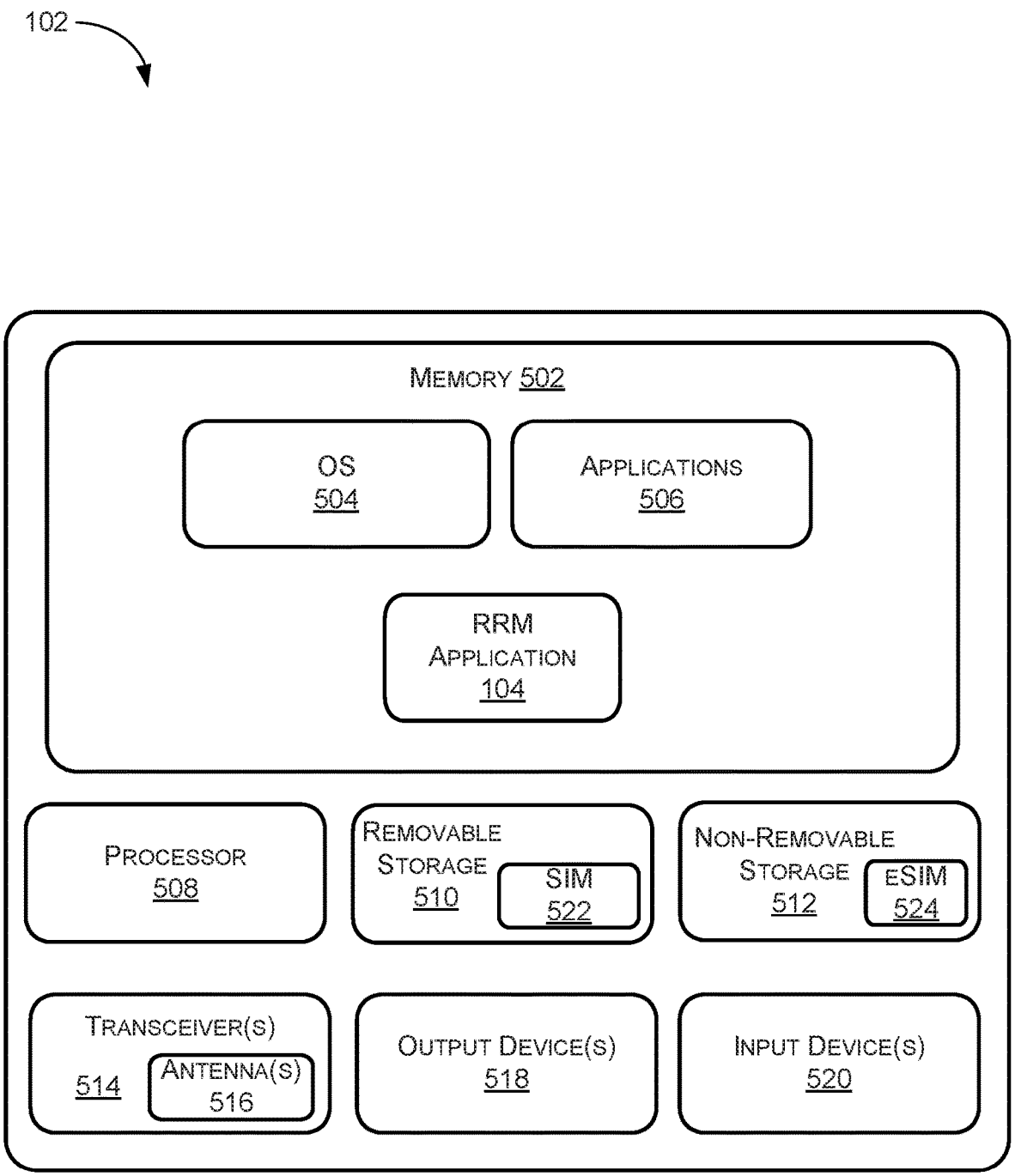
FIG. 5 is an example of a UE for use with the systems and methods disclosed herein, in accordance with some examples of the present disclosure.

FIG. 5 depicts a component level view of an example of the UE 102 for use with the systems and methods described herein. The UE 102 could be any UE capable of making audio and/or video calls, connecting to the WWW 114, and providing other services on the cellular network 110, the IMS 200, and/or IP networks 112 (discussed above). For clarity, the UE 102 is described herein generally as a cell phone, smart phone, or tablet computer. One of skill in the art will recognize, however, that the systems and methods described herein can also be used with a variety of other electronic devices, such as, for example, laptop computers, desktops, and other network connected devices that use antennas with multiple modes of operation. Indeed, the UE 102 can be any device that can send and receive wireless communications and that can benefit from improved antenna management.

The UE 102 can comprise several components to execute the above-mentioned functions. As discussed below, the UE 102 can comprise memory 502 including an operating system (OS) 504 and one or more standard applications 506. The standard applications 506 can include many features common to UEs such as, for example, calendars, call logs, voicemail, etc. The standard applications 506 can also comprise a video call application, an audio call application, and a messaging application, among other things. The standard applications 506 can also include contacts to enable the user to select a contact, for example, to initiate an audio or video call.

The UE 102 can also comprise the RRM application 104. As mentioned above, the antenna management discussed herein can be performed on the UE 102, on the NRRM server 116, or a combination thereof. In some examples, the RRM application 104 may simply send and receive RRC messages to and from the NRRM server 116 and update antenna settings accordingly. In other examples, the RRM application 104 can receive or calculate SQIs from the transceiver(s) 514 and/or antenna(s) 516, make additional calculations, and reconfigure the antennas 516 independently of the network.

The UE 102 can also comprise one or more processors 508 and one or more of removable storage 510, non-removable storage 512, transceiver(s) 514, antenna(s) 516, output device(s) 518, and input device(s) 520. In some examples, such as for cellular communication devices, the UE 102 can also include a subscriber identity module (SIM) 522 and/or an embedded SIM (eSIM) 524, which can include a mobile country code (MCC), mobile network code (MNC), international mobile subscriber identity (IMSI), cellular phone number, and other relevant information. In some examples, one or more of the functions (e.g., standard applications 506 and/or the RRM application 104) can be stored on the SIM 522 or the eSIM 524 in addition to, or instead of, being stored in the memory 502 of the UE 102.

In various implementations, the memory 502 can be volatile (such as random access memory (RAM)), non-volatile (such as read only memory (ROM), flash memory, etc.), or some combination of the two. The memory 502 can include all, or part, of the applications 104, 506 and the OS 504 for the UE 102, among other things. In some examples, rather than being stored in the memory 502, some, or all, of the applications 104, 506 and the OS 504, and other information (e.g., call history, contacts, etc.) can be stored on a remote server or a cloud of servers accessible by the UE 102 such as the TAS 122.

The memory 502 can also include the OS 504. Of course, the OS 504 varies depending on the manufacturer of the UE 102 and currently comprises, for example, iOS 11.4.1 for Apple products and Pie for Android products. The OS 504 contains the applications and software that support a UE's basic functions, such as scheduling tasks, executing applications, and controlling peripherals. In some examples, the OS 504 can enable the RRM application 104 to receive data from the transceiver(s) 514 and/or antenna(s) 516, make calculations, and reconfigure the antenna(s) 516, as necessary. The OS 504 can also enable the UE 102 to send and receive data (e.g., RRC messages) to and from the WBS 106 via the cellular connection 110 and/or the IP connection 112 and perform other functions.

The UE 102 can also comprise one or more processors 508. In some implementations, the processor(s) 508 can be a central processing unit (CPU), a graphics processing unit (GPU), both CPU and GPU, or any other processing unit. The UE 102 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the applications 104, 506 and the OS 504.

Non-transitory computer-readable media may include volatile and nonvolatile, removable and non-removable tangible, physical media implemented in technology for storage of information, such as computer readable instructions, data structures, program applications, or other data. The memory 502, removable storage 510, and non-removable storage 512 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102 or may be a separate database, databank, remote server, or cloud-based server.

In some implementations, the transceiver(s) 514 include any transceivers known in the art. In some examples, the transceiver(s) 514 can include wireless modem(s) to facilitate wireless connectivity with other components (e.g., other UE), the Internet, and/or an intranet via the cellular 110 and/or IP 112 networks. Specifically, the transceiver(s) 514, in concert with the antennas 516 (discussed below) can include multiple modes such as the aforementioned MIMO, diversity, and main RX modes and can enable the antennas 516 to be reconfigured as network conditions change. Thus, the transceiver(s) 514 can include multiple single-channel transceivers or a multi-frequency, multi-channel transceiver. The transceiver(s) 514 can enable the UE 102 to connect to multiple networks including, but not limited to the 2G 202, 3G 204, 4G 206, 5G 208, and Wi-Fi 108 networks. The transceiver(s) can also include one or more transceivers to enable the UE 102 to connect to future (e.g., 6G) networks, Internet-of-Things (IoT), machine-to machine (M2M), and other current and future networks.

The transceiver(s) 514 may also include one or more radio transceivers that perform the function of transmitting and receiving radio frequency communications via an antenna (e.g., Wi-Fi 108 or Bluetooth®). In other examples, the transceiver(s) 514 may include wired communication components, such as a wired modem or Ethernet port, for communicating via one or more wired networks. The transceiver(s) 514 can enable the UE 102 to make audio and video calls, download files, access web applications, and provide other communications associated with the systems and methods, described above.

The transceiver(s) 514 can also be in communication with one or more antenna(s) 516. The UE 102 can include a single, multi-frequency antenna, or multiple antennas configured for different frequencies or frequency ranges. In some examples, as mentioned above, the antenna(s) 516 can comprise a multi-element MIMO antenna array capable of MIMO Rx mode, diversity Rx mode, and main Rx mode, among other things. In some examples, the antenna(s) 516 can comprise a 2×2 MIMO antenna array, though other configurations are contemplated. As discussed above, the RRM application 104 and/or the NRRM server 116 can provide configuration messages, or RRC messages, to the antenna(s) 516 and/or the transceiver(s) 514 to reconfigure the antenna(s) 516 according to one or more SQIs.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. The output device(s) 518 can also include speakers, or similar devices, to play sounds or ringtones. The output device(s) 518 can also provide different tones or sounds when, for example, the antenna(s) 516 reconfigure (e.g., to inform the user that reception is getting better or worse). Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can be used to display a graphical user interface (GUI), for example, and to act as both an input device 520 and an output device 518.

Figure 6:
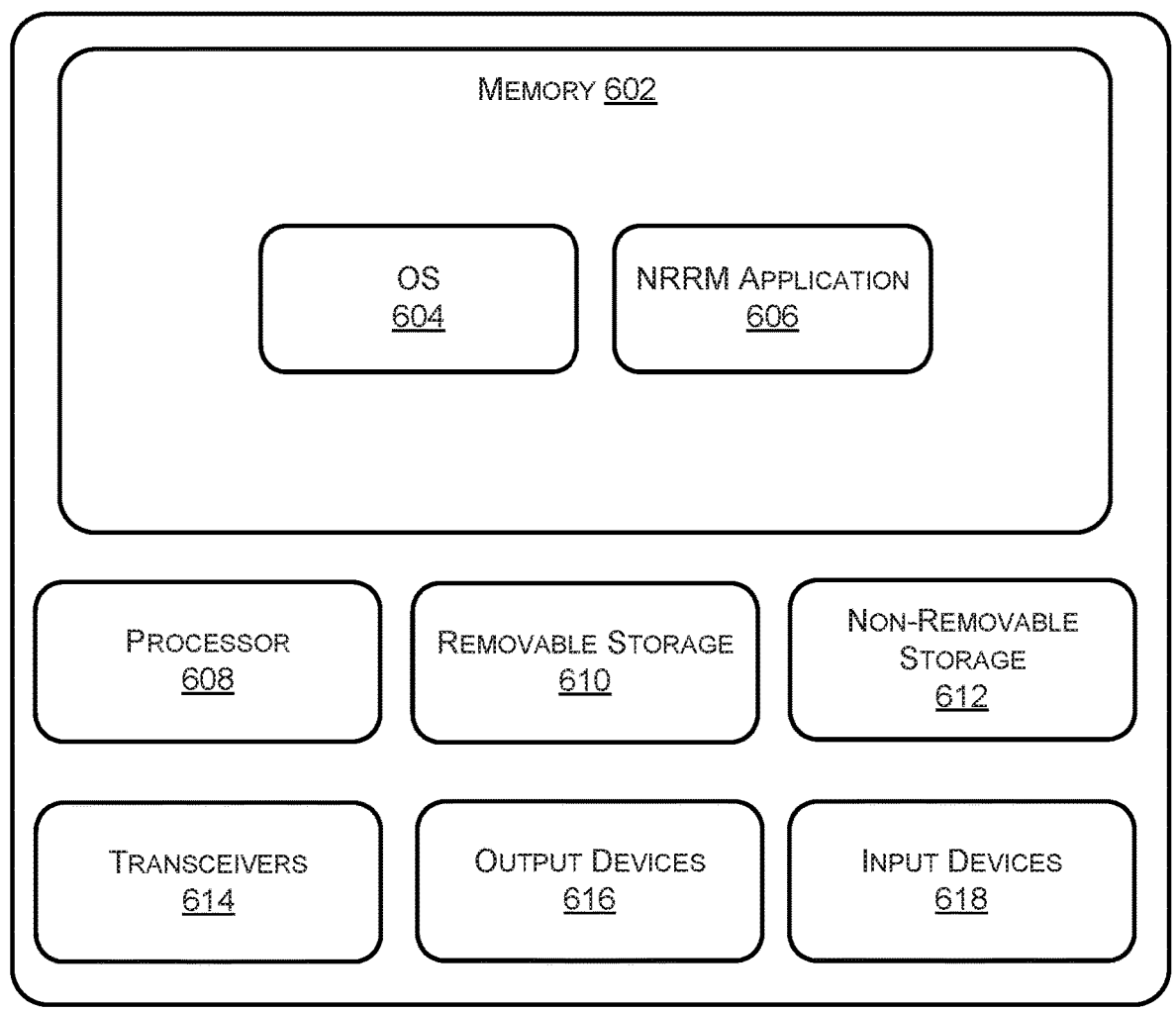
FIG. 6 is an example of a network radio resource management (NRRM) server for use with the systems and methods disclosed herein, in accordance with some examples of the present disclosure.

As shown in FIG. 6, the systems and methods discussed herein can also be used in conjunction with the NRRM server 116. To simplify the discussion, the NRRM server 116 is discussed below as a standalone server. One of skill in the art will recognize, however, that the systems and methods disclosed herein can also be implemented partially, or fully, on an existing network entity such as, for example, the HLR/HSS 210, the P-CSCF 216, or on another existing network entity. Thus, the discussion below in terms of the NRRM server 116 is not intended to limit the disclosure to the use of a standalone server. The NRRM server 116 can be a TAS 122, for example, capable of connecting with multiple UEs 102 and providing RRM and other functions, as discussed above.

The NRRM server 116 can comprise a number of components to execute part, or all, of the above-mentioned systems and methods. The NRRM server 116 can comprise memory 602 including, for example, an OS 604 and an NRRM application 606. In various implementations, the memory 602 can be volatile (such as RAM), non-volatile (such as ROM, flash memory, etc.), or some combination of the two. The memory 602 can include all, or part, of the NRRM application 606 and the OS 604 for the NRRM server 116, among other things.

The OS 604 can vary depending on the manufacturer of the NRRM server 116 and the type of component. Many servers, for example, run Linux or Windows server. Dedicated cellular routing servers may run specific telecommunications OSs. The OS 604 contains the applications and software that supports a computer's basic functions, such as scheduling tasks, executing applications, and controlling peripherals. The OS 604 can enable the NRRM server 116 to send and receive RRC, SIP, and HTTP messages, connect with UEs 102, reconfigure antennas 516, etc. Thus, the OS 604 can also enable the NRRM server 116 to perform some, or all, of the functions associated with the systems and methods discussed herein.

In some examples, the memory 602 can also include the NRRM application 606. The NRRM application 606 can, for example, receive RRC messages from the UE 102, calculate SQIs, and make some or all of the antenna configuration decisions for the UE 102. The NRRM application 606 can then send RRC messages via the transceiver(s) 614 to reconfigure the antenna on the UE 102, as necessary. The NRRM application 606 can include subroutines suitable to carry out some or all of the methods 300, 400 described herein.

The NRRM server 116 can also comprise one or more processors 608. In some implementations, the processor(s) 608 can be a central processing unit (CPU), a graphics processing unit (GPU), both CPU and GPU, or any other processing unit. The NRRM server 116 can also include one or more of removable storage 610, non-removable storage 612, transceiver(s) 614, output device(s) 616, and input device(s) 618.

The NRRM server 116 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store some, or all, of the OS 604 and the NRRM application 606.

Non-transitory computer-readable media may include volatile and nonvolatile, removable and non-removable tangible, physical media implemented in technology for storage of information, such as computer-readable instructions, data structures, program applications, or other data. The memory 602, removable storage 610, and non-removable storage 612 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the NRRM server 116. Any such non-transitory computer-readable media may be part of the NRRM server 116 or may be a separate database, databank, remote server, or cloud-based server.

In some implementations, the transceiver(s) 614 include any transceivers known in the art. In some examples, the transceiver(s) 614 can include wireless modem(s) to facilitate wireless connectivity with multiple UEs (e.g., UE 102), the Internet, the cellular network, and/or an intranet via a cellular connection. The transceiver(s) 614 may enable the NRRM server 116 to connect with the UEs on multiple networks (e.g., the 2G 202 3G 204, 4G 206, 5G 208, and Wi-Fi 108 networks). The transceiver(s) 614 can comprise multiple single frequency transceivers or one or more multi-frequency/multi-channel transceivers to enable the NRRM server 116 to communicate with tens, hundreds, or even thousands of UEs simultaneously. The transceiver(s) 614 can also enable the NRRM server 116 to receive RRC messages from UE 102, for example, and then send RRC messages to reconfigure antennas 516 on the UE 102, as necessary.

The transceiver(s) 614 may include a radio transceiver that performs the function of transmitting and receiving radio frequency communications via an antenna (e.g., Wi-Fi 108 or Bluetooth®) to connect to the IP network 112 or another network. In other examples, the transceiver(s) 614 may include wired communication components, such as a wired modem or Ethernet port.

In some implementations, the output device(s) 616 include any output devices known in the art, such as a display (e.g., a liquid crystal or thin-film transistor (TFT) display), a touchscreen display, speakers, a vibrating mechanism, or a tactile feedback mechanism. In some examples, the output device(s) 616 can play various sounds based on, for example, when an RRC message is received, when the antennas 516 on the UE 102 need to be reconfigured, etc. Output device(s) 616 can also include ports for one or more peripheral devices, such as headphones, peripheral speakers, or a peripheral display.

In various implementations, input device(s) 618 include any input devices known in the art. For example, the input device(s) 618 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to antenna management on cellular UEs 102, the system could be used to provide enhanced antenna management for many types of devices on many networks including, for example, Wi-Fi 108, M2M, IoT, or future networks. Indeed, the systems and methods discussed herein could be used in the same, or a similar, manner to provide improved antenna management and cell-edge reception on many kinds of devices that are capable of connecting to one or more wireless voice and data networks. In addition, while various functions are discussed as being performed on the UE 102 or the NRRM server 116, for example, other components, such as various other network entities (e.g., the I-CSCF 118 or S-CSCF 120), could perform some, or all, of these functions without departing from the spirit of the invention.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A network entity associated with a network provider comprising:
    a transceiver to send and receive at least one of wired or wireless transmissions;
    memory storing computer-executable instructions including a network radio resource management (NRRM) application; and
    a processor in communication with at least the transceiver and the memory, the computer-executable instructions causing the processor to perform acts comprising:
        receiving, with the transceiver, a first signal from a user equipment (UE), the first signal including a first radio resource control (RRC) message;
        determining, with the NRRM application, based at least in part on a first value of a first signal quality indicator (SQI) in the first RRC message to activate a diversity receive (Rx) mode on an antenna on the UE;
        sending, with the transceiver, a second signal to the UE, the second signal causing the UE to activate the diversity Rx mode of the antenna;
        receiving, with the transceiver, a third signal from the UE, the third signal including a second RRC message;
        determining, with the NRRM application, based at least in part on a second value of a second SQI in the second RRC message to deactivate the diversity Rx mode on the antenna; and
        sending, with the transceiver, a fourth signal to the UE to cause the UE to deactivate the diversity Rx mode of the antenna and activate a main Rx mode of the antenna.

2. The network entity of claim 1, wherein:
    the first SQI and the second SQI comprise a signal-to-interference noise ratio (SINR);
    the first value comprises an SINR that is greater than 0 dB and less than 12 dB; and
    the second value comprises an SINR less than or equal to 0 dB.

3. The network entity of claim 1 wherein:
    the first SQI comprises a rank indicator (RI);
    the first value is equal to 1;
    the second SQI comprises a signal-to-interference noise ratio (SINR); and
    the second value comprises an SINR less than or equal to 0 dB.

4. The network entity of claim 1, the computer-executable instructions causing the processor to perform acts comprising:
    receiving, with the transceiver, a fifth signal from the UE, the fifth signal including a third RRC message;
    determining, with the NRRM application, based at least in part on a third value of a third SQI in the third RRC message to activate a multiple-in-multiple-out (MIMO) Rx mode on the antenna; and
    sending, with the transceiver, a sixth signal to the UE, the sixth signal causing the UE to activate the MIMO Rx mode on the antenna.

5. The network entity of claim 4, wherein:
    the third SQI comprises a rank indicator (RI); and
    the third value comprises an RI equal to 2.

6. The network entity of claim 4, wherein:
    the third SQI comprises a signal-to-interference noise ratio (SINR); and
    the third value comprises an SINR greater than or equal to 12 dB.

7. A user equipment (UE) comprising:
    a transceiver to send and receive at least one of wired or wireless transmissions;
    an antenna in communication with the transceiver comprising at least a main receive (Rx) mode, a diversity Rx mode, and a multiple-in-multiple-out (MIMO) mode;
    memory storing computer-executable instructions including at least a radio resource management (RRM) application; and
    a processor in communication with at least the transceiver and the memory, the computer-executable instructions causing the processor to perform acts comprising:
        receiving, at the RRM application, a first signal from the transceiver, the first signal comprising a first value for a first signal quality indicator (SQI), the first SQI associated with a first signal quality at the antenna;
        determining, with the RRM application, based at least in part on the first value, to activate the diversity Rx mode on the antenna;
        sending, with the RRM application, a second signal to the antenna to activate the diversity Rx mode on the antenna;
        receiving, at the RRM application, a third signal from the transceiver, the third signal comprising a second value for a second SQI, the second SQI associated with a second signal quality at the antenna;
        determining, with the RRM application, based at least in part on the second value to deactivate the diversity Rx mode on the antenna and activate the main Rx mode on the antenna;
        sending, with the RRM application, a fourth signal to the antenna to cause the antenna to deactivate the diversity Rx mode on the antenna and activate the main Rx mode on the antenna;
        receiving, at the RRM application, a fifth signal from the transceiver, the fifth signal including a third value for a third SQL the third SQI associated with a third signal quality at the antenna;
        determining, with the RRM application, based at least in part on the third value to reactivate the diversity Rx mode on the antenna or activate the MIMO Rx mode on the antenna; and sending, with the RRM application, a sixth signal to the antenna to activate the diversity Rx mode on the antenna or activate the MIMO Rx mode on the antenna.

8. The UE of claim 7, wherein:
the first SQI and the second SQI comprise a signal-to-interference noise ratio (SINR);
the first value comprises an SINR that is greater than 0 dB and less than 12 dB; and
the second value comprises an SINR that is greater than −6 dB and less than or equal to 0 dB.

9. The UE of claim 7, wherein:
the third SQI comprises a signal-to-interference noise ratio (SINR); and
the third value comprises an SINR between −6 dB and 6 dB.

10. The UE of claim 7, wherein:
the third SQI comprises a rank indicator (RI); and
the third value comprises an RI equal to 2.

11. The UE of claim 7, wherein:
the third SQI comprises a signal-to-interference noise ratio (SINR); and
the third value comprises an SINR greater than or equal to 12 dB.

12. A method comprising:
receiving, with a transceiver of a network entity, a first signal from a user equipment (UE), the first signal including a first radio resource control (RRC) message;
determining, with a network radio resource management (NRRM) application on the network entity, based at least in part on a first value of a first signal quality indicator (SQI) in the RRC message to activate a diversity receive (Rx) mode on an antenna of the UE;
sending, with the transceiver, a second signal to the UE, the second signal to cause the UE to activate the diversity Rx mode on the antenna;
receiving, with the transceiver, a third signal from the UE, the third signal including a second RRC message; and
determining, with the NRRM application, based at least in part on a second value of a second SQI in the RRC message that the diversity Rx mode on the antenna is to be deactivated.

13. The method of claim 12, further comprising:
sending, with the transceiver, a fourth signal to the UE to cause the UE to deactivate the diversity Rx mode on the antenna and activate a main Rx mode on the antenna.

14. The method of claim 12, wherein:
the second SQI comprises a block error rate (BLER); and
the second value comprises a BLER greater than 6%.

15. The method of claim 12, wherein:
the second SQI comprises a scheduling rate (SR); and
the second value comprises an SR greater than 35%.

16. The method of claim 12, further comprising:
setting, with a processor of the network entity, a timer in response to determining that the diversity Rx mode on the antenna is to be deactivated;
receiving, with the transceiver and in response to the timer expiring, a fourth signal from the UE, the fourth signal including a third RRC message;
determining, with the NRRM application, based at least in part on the second value of the second SQI and a third value of a third SQI that the diversity Rx mode on the antenna is to be deactivated; and
sending, with the transceiver, a fifth signal to the UE to cause the UE to deactivate the diversity Rx mode on the antenna and activate a main Rx mode on the antenna.

17. The method of claim 12, further comprising:
setting a timer in response to determining that the diversity Rx mode on the antenna is to be deactivated;
receiving, with the transceiver and in response to the timer expiring, a fourth signal from the UE, the fourth signal including a third RRC message; and
determining, with the NRRM application, based at least in part on a third value of a third SQI that the diversity Rx mode on the antenna is not to be deactivated.

18. The method of claim 17, wherein:
the second SQI and the third SQI comprise a BLER;
the second value is greater than 6% BLER; and
the third value is less than or equal to 6% BLER.

\* \* \* \* \*